United States Patent
Catherwood et al.

(10) Patent No.: US 12,346,722 B2
(45) Date of Patent: Jul. 1, 2025

(54) SYSTEMS AND METHODS FOR MANAGING INTERRUPT PRIORITY LEVELS

(71) Applicant: Microchip Technology Incorporated, Chandler, AZ (US)

(72) Inventors: Michael Catherwood, Tyler, TX (US); Howard Schlunder, Mesa, AZ (US); David Mickey, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 489 days.

(21) Appl. No.: 18/073,075

(22) Filed: Dec. 1, 2022

(65) Prior Publication Data

US 2023/0176898 A1 Jun. 8, 2023

Related U.S. Application Data

(60) Provisional application No. 63/286,634, filed on Dec. 7, 2021.

(51) Int. Cl.
G06F 9/48 (2006.01)
G06F 8/71 (2018.01)

(52) U.S. Cl.
CPC .............. *G06F 9/4831* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 5,375,211 | A * | 12/1994 | Maruyama | G06F 11/0793 710/262 |
| 2004/0205753 | A1* | 10/2004 | Moore | G06F 9/4825 718/100 |
| 2006/0294348 | A1* | 12/2006 | Sugure | G06F 13/24 712/244 |
| 2015/0019847 | A1* | 1/2015 | Catherwood | G06F 9/3865 712/229 |

OTHER PUBLICATIONS

Anonymous, "16-Bit MCU and DSC Programmer's Reference Manual," Microchip Technology Incorporated, URL: https://ww1.microchip.com/downloads/en/DeviceDoc/70000157g.pdf, 400 pages, Oct. 25, 2017.

(Continued)

*Primary Examiner* — Adam Lee
(74) *Attorney, Agent, or Firm* — SLAYDEN GRUBERT BEARD PLLC

(57) ABSTRACT

A system includes non-transitory computer readable memory and a processor. The non-transitory computer readable memory stores a current processor interrupt priority level and a current disable interrupt control (DISICTL) interrupt priority level. The processor to update the current processor interrupt priority level based on respective interrupt priority levels associated with respective exceptions, and update the current DISICTL interrupt priority level based on a respective DISICTL instruction, wherein the respective DISICTL instruction specifies a respective user-definable DISICTL interrupt priority level. The processor determines a highest interrupt priority level between the current processor interrupt priority level and the current DISICTL interrupt priority level, and apply the highest interrupt priority level during execution of respective code.

20 Claims, 7 Drawing Sheets

(56) References Cited

OTHER PUBLICATIONS

Anonymous, MPLAB XC32 C/C++ Compiler User's Guide for PIC32M MCUs, Microchip Technology Incorporated, URL: https://ww1.microchip.com/downloads/en/DeviceDoc/MPLAB%XC32%20C%20Compiler%20for%20PIC32M%20MCU%20UG%2050002799B.pdf, 246 pages, 2020.

Anonymous, "MPLAB XC16 C Compiler User's Guide," Microchip Technology Incorporated, URL: https://ww1.microchip.com/downloads/en/DeviceDoc/50002071K.pdf, 399 pages, Feb. 28, 2020.

International Search Report and Written Opinion, Application No. PCT/US2022/051926, 13 pages, Mar. 15, 2023.

* cited by examiner

SYSTEMS AND METHODS FOR MANAGING INTERRUPT PRIORITY LEVELS

RELATED PATENT APPLICATION

This application claims priority to commonly owned U.S. Provisional Patent Application No. 62/286,634 filed Dec. 7, 2021, the entire contents of which are hereby incorporated by reference for all purposes.

TECHNICAL FIELD

The present disclosure relates to computer processing, and more particularly to systems and methods for managing interrupt priority levels.

BACKGROUND

Computer processors (e.g., microprocessors, central processing units (CPUs), digital signal processors (DSPs), digital signal controllers (DSCs), etc.) commonly implement "interrupts" to interrupt some currently executing code to process an event that needs attention. To initiate an interrupt, the processor receives an interrupt request and determines whether to accept the request. If the request is accepted, the processor suspends its current activities and executes an interrupt handler to handle the event needing attention. After the event is handled, the processor resumes its prior activities. In some systems, the interrupt handler processes interrupt events according to an interrupt priority level (IPL) assigned to each event.

In some computer systems or situations, a processor needs to execute certain important code without interruption, e.g., in order to complete the code execution within a defined execution time constraint. Thus, some systems include an instruction for disabling interrupts to allow execution of important code without interruption. For example, some microcontrollers available from Microchip Technology, Inc., of Chandler, Arizona include a "disable interrupt" or "DISI" instruction that disables all interrupts of IPL6 or lower for a finite amount of time (defined by a specified cycle count). However, disabling interrupts for a fixed period of time may have limited practicality in devices with less deterministic execution times. In addition, the DISI instruction disables interrupts up to IPL6, but allows interrupts of higher priority than IPL6, such as IPL7, which may be unwanted in some situations. In addition, the DISI instruction has limited compatibility with reentrant code.

SUMMARY

The present disclosure provides systems and methods for managing the handling of exceptions (e.g., interrupts and/or traps) based on interrupt priority levels (IPLs). In some examples, disable interrupt control (DISICTL) instructions are used to establish and/or update a current DISICTL IPL, which disables exceptions having an associated IPL equal to or below the current DISICTL IPL. DISICTL instructions may be used, for example, to allow execution of high-priority code by a processor without interruption by lower-priority exceptions, e.g., exceptions having an associated IPL equal to or below the current DISICTL IPL. In other examples, the current DISICTL IPL disables exceptions with an IPL below the current DISICTL IPL but allows the handling of exceptions with an IPL equal to the current DISICTL IPL (instead of disabling exceptions with an IPL equal to or below the current DISICTL IPL).

In some examples, the current DISICTL IPL may be set to any value between IPL=0 (no exceptions disabled) and IPL 7 (all exceptions disabled), and may be updated (and/or deactivated) over time by respective DISICTL instructions. In some examples, the current DISICTL IPL remains persistent (unchanged) until execution of a subsequent DISICTL instruction specifying a different DISICTL IPL.

In some examples, the current DISICTL IPL is repeatedly compared with the current operating IPL of the processor, referred to herein as the current processor IPL, to determine a highest IPL of the current DISICTL IPL and the current Processor IPL, which highest IPL is applied to new and pending exceptions. In this manner, the current DISICTL IPL prevents the handling of (i.e., disables) exceptions with an IPL equal to or below the current DISICTL IPL. As discussed above, in other examples the current DISICTL IPL disables exceptions with an IPL below the current DISICTL IPL but allows the handling of exceptions with an IPL equal to the current DISICTL IPL, unlike the current processor IPL which disables (queues) exceptions having an IPL equal to or below the current processor IPL. In such examples, the system may implement any suitable operations, techniques, or scheme to account for this difference between the current processor IPL (disabling IPLs equal to or below the current processor IPL 106) and the current DISICTL IPL 108 (disabling IPLs below (but not equal to) the current DISICTL IPL 108), e.g., as discussed in more detail below with reference to FIG. 1.

In some examples, a respective DISICTL instruction may indicate (a) a new DISICTL IPL to be set as the current DISICTL IPL and optionally (b) a storage destination. To indicate the new DISICTL IPL to be set as the current DISICTL IPL, the DISICTL instruction may specify (a) a value of the new DISICTL IPL, or alternatively (b) a memory address storing a prior DISICTL IPL (e.g., a DISICTL IPL previously replaced by a prior DISICTL instruction) to be set (restored) as the current DISICTL IPL. The DISICTL IPLs specified in respective DISICTL instructions may be user-defined, e.g., selected by a code developer or other user creating the respective DISICTL instructions.

The (optional) storage destination specified in the respective DISICTL instruction may indicate a memory location for storing the current DISICTL IPL being replaced by the new DISICTL IPL, wherein the (replaced) current DISICTL IPL is stored as a "prior DISICTL IPL." The stored prior DISICTL IPL may be accessed by a subsequent DISICTL instruction and restored as the current DISICTL IPL. In some examples, DISICTL IPLs may be stored and restored using nested DISICTL instructions, e.g., for execution of code with subroutines, function calls, or interrupt service routines with different priority levels.

One aspect provides a system comprising non-transitory computer readable memory and a processor. The non-transitory computer readable memory stores a current processor IPL and a current DISICTL IPL. The processor updates the current processor IPL based on respective IPLs associated with respective exceptions; update the current DISICTL IPL based on a respective DISICTL instruction, wherein the respective DISICTL instruction specifies a respective user-definable DISICTL IPL; determine a highest IPL between the current processor IPL and the current DISICTL IPL; and apply the highest IPL during execution of respective code.

In some examples, the processor to apply the highest IPL during execution of respective code comprises the processor to disregard exceptions having a respective IPL equal to, or lower than, the highest IPL.

In some examples, the non-transitory computer readable memory includes at least one first register in the processor storing the current processor IPL, and at least one second register in the processor storing the current DISICTL IPL.

In some examples, the respective DISICTL instruction specifies a respective user-definable DISICTL IPL values from 0 to 7.

In some examples, the respective DISICTL instruction specifies the respective user-definable DISICTL IPL using a respective 3-bit literal.

In some examples, the respective DISICTL instruction specifies the respective user-definable DISICTL IPL using a least significant 3-bits of defined register contents.

In some examples, the respective DISICTL instruction specifying the respective user-definable DISICTL IPL comprises the respective DISICTL instruction specifying a value of a user-definable DISICTL IPL.

In some examples, the respective DISICTL instruction specifying the respective user-definable DISICTL IPL comprises the respective DISICTL instruction specifying a memory location of a prior DISICTL IPL.

In some examples, the respective DISICTL instruction specifies (a) a respective user-definable DISICTL IPL and (b) a storage destination; and the processor to execute the respective DISICTL instruction, including (i) updating the current DISICTL IPL from a prior DISICTL IPL to the respective user-definable DISICTL IPL specified in the respective DISICTL instruction, and (ii) storing the prior DISICTL IPL in the storage destination specified in the respective DISICTL instruction.

In some examples, the processor to execute the respective DISICTL instruction specifying a first user-definable DISICTL IPL, wherein execution of the respective DISICTL instruction includes update the current DISICTL IPL from a prior DISICTL IPL to the first user-definable DISICTL IPL specified in the respective DISICTL instruction.

In some examples, execution of the respective DISICTL instruction includes storing the prior DISICTL IPL, and the processor to restore the stored prior DISICTL IPL as the current DISICTL IPL after the execution of a first piece of code.

In some examples, the processor to store the prior DISICTL IPL responsive to receiving the respective DISICTL instruction, and after the execution of a first piece of code associated with the respective DISICTL instruction, to restore the stored prior DISICTL interrupt priority level as the current DISICTL interrupt priority level.

In some examples, the non-transitory computer readable memory includes a first memory location storing the current processor IPL, and a second memory location storing the current DISICTL IPL, and a third memory location storing the prior DISICTL IPL.

In some examples, the processor to, after executing a portion of the first piece of code, execute a second user-definable DISICTL instruction to update the current DISICTL IPL to a second user-definable DISICTL interrupt priority higher than the respective user-definable DISICTL IPL. The processor to apply the second user-definable DISICTL IPL during execution of a second piece of the respective code; restore the current DISICTL IPL to the first user-definable DISICTL IPL after the execution of the second piece of code; and continue execution of the first piece of code.

One aspect provides a system including non-transitory computer readable memory and a processor. The non-transitory computer readable memory includes a first memory location for storing a current DISICTL IPL, and a second memory location for storing a prior DISICTL IPL. The processor to store a first DISICTL IPL associated with a first DISICTL instruction as the current DISICTL IPL in the first memory location, and apply the first DISICTL IPL during execution of a first piece of code. The processor further to execute a second DISICTL instruction specifying a second DISICTL IPL, including storing the second DISICTL IPL specified by the second DISICTL instruction as the current DISICTL IPL in the first memory location, and storing the first DISICTL IPL as the prior DISICTL IPL in the second memory location. The processor further to apply the second DISICTL IPL during execution of a second piece of code.

In some examples, the second DISICTL instruction specifying the second DISICTL IPL comprises the second DISICTL instruction specifying the second memory location, and the processor to store the second DISICTL IPL specified by the second DISICTL instruction as the current DISICTL IPL in the first memory location comprises the processor to (a) access the prior DISICTL IPL stored in the second memory location and (b) store the accessed prior DISICTL IPL as the current DISICTL IPL in the first memory location.

In some examples, the processor to execute a third DISICTL instruction specifying a third DISICTL IPL, including storing the third DISICTL IPL specified by the third DISICTL instruction as the current DISICTL IPL in the first memory location, and storing the second DISICTL IPL as the prior DISICTL IPL in the second memory location. The processor further to apply the third DISICTL IPL during execution of a third piece of code.

One aspect provides a method including storing in non-transitory computer readable memory a current processor IPL, and storing in non-transitory computer readable memory a current disable interrupt control (DISICTL) IPL. The method also includes updating, by a processor, the current processor IPL based on respective IPLs associated with respective exceptions, and updating, by the processor, the current DISICTL IPL based on a respective DISICTL instruction, wherein the respective DISICTL instruction specifies a respective user-definable DISICTL IPL. The method also includes determining, by the processor, a highest IPL between the current processor IPL and the current DISICTL IPL, and applying, by the processor, the highest IPL during execution of respective code.

In some examples, applying the highest IPL during execution of respective code comprises disregarding exceptions having a respective IPL equal to or lower than the highest IPL.

In some examples, a respective DISICTL instruction specifying a respective DISICTL IPL comprises the respective DISICTL instruction specifying a DISICTL IPL value, and updating the current DISICTL interrupt priority level based on the respective DISICTL instruction comprises setting the current DISICTL interrupt priority level to the value of the respective DISICTL interrupt priority level specified in the respective DISICTL instruction.

In some examples, a respective DISICTL instruction specifying a respective DISICTL IPL comprises the respective DISICTL instruction specifying a memory location of a prior DISICTL IPL, and updating the current DISICTL IPL based on the respective DISICTL instruction includes accessing the prior DISICTL IPL in the memory location specified in the respective DISICTL instruction and setting the accessed prior DISICTL IPL as the current DISICTL IPL.

In some examples, the method includes executing, by the processor, a first DISICTL instruction to set the current DISICTL IPL to a first user-definable DISICTL IPL specified in the first DISICTL instruction, wherein determining the highest interrupt priority level between the current processor interrupt priority level and the current DISICTL interrupt priority level comprises determining the current DISICTL interrupt priority level, set to the first user-definable DISICTL interrupt priority level, is highest interrupt priority level, and applying, by the processor, the first user-definable DISICTL IPL during execution of a first piece of code.

In some examples, executing the first DISICTL instruction also includes storing in non-transitory computer readable memory a prior DISICTL IPL, and the method also includes, after the execution of the first piece of code, accessing the stored prior DISICTL IPL and setting the accessed prior DISICTL IPL as the current DISICTL IPL.

In some examples, the method includes executing a second user-definable DISICTL instruction after executing a portion of the first piece of code, wherein executing the second DISICTL instruction includes setting the current DISICTL IPL to a specified second user-definable DISICTL IPL higher than the first user-definable DISICTL IPL. The method also includes applying the second user-definable DISICTL IPL during execution of a second piece of code, restoring the first user-definable DISICTL IPL as the current DISICTL IPL after execution of the second piece of code, continuing execution of the first piece of code, and applying the first user-definable DISICTL IPL during the continued execution of the first piece of code.

BRIEF DESCRIPTION OF THE DRAWINGS

Example aspects of the present disclosure are described below in conjunction with the figures, in which.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
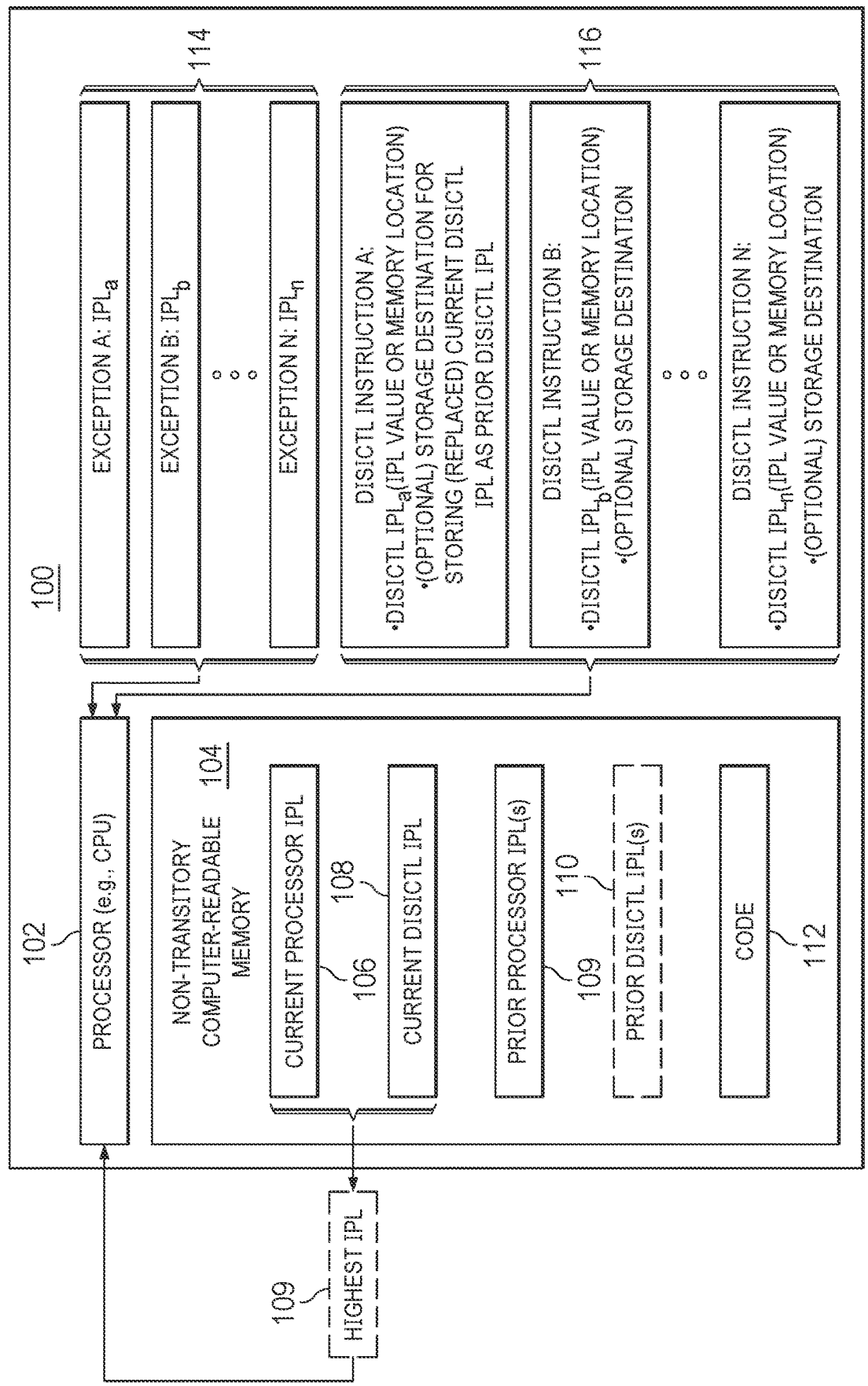
FIG. 1 shows an example system (e.g., computer system) for managing exceptions, according to some examples.

FIG. 1 shows an example system (e.g., computer system) 100 for managing exceptions, according to some examples.

System 100 includes a processor 102 and a non-transitory computer readable memory 104. Processor 102 may comprise a central processing unit (CPU), microprocessor, microcontroller, processor core(s), or any other type of computer processor. Non-transitory computer readable memory 104 may include one or more types and/or instances of computer memory devices, for example one or more volatile memory devices and/or non-volatile memory devices. For example, at least a portion of non-transitory computer readable memory 104 may include one or more of the following: read-only memory (ROM) (e.g., erasable programmable ROM (EPROM), electrically erasable programmable ROM (EEPROM)), flash memory, random access memory (RAM), cache memory, processor registers, and storage disks. Non-transitory computer readable memory 104 is also referred to herein as memory 104 for convenience.

In some examples, memory 104 stores (a) a current processor interrupt priority level (IPL) 106, (b) a current DISICTL IPL 108, (c) at least one prior processor IPL 109, and optionally (d) at least one prior DISICTL IPL 110. Memory 104 also stores various executable code 112 (referred to herein as code 112) executable by the processor 102. Code 112 may be embodied in software or firmware. A respective collection or set of code 112, e.g., for example a respective group of code blocks, lines of code, routine, program, or other set of instructions, is referred to herein as a "piece of code." Any of the current processor IPL 106, current DISICTL IPL 108, prior processor IPL(s) 109, (optional) prior DISICTL IPL(s) 110, and code 112 may be stored in respective memory locations in the same or separate instances and/or types of memory 104. For example, as discussed below with reference to FIG. 3, in one example the current processor IPL 106 is stored in first register(s) 122a in the processor 104, the current DISICTL IPL 108 is stored in second register(s) 122b in the processor 104, the prior processor IPL(s) 109 is/are stored in the processor stack (e.g., in RAM or DRAM), and code 112 and the (optional) prior DISICTL IPL(s) 110 is/are stored in external memory 124 (external to the processor 102).

The processor 102 may process exceptions 114 (e.g., interrupts and/or traps, often referred to as CPU exceptions or processor exceptions) and DISICTL instructions 116. Respective exceptions 114 and respective DISICTL instructions 116 may be defined in respective code 112 stored in system 100 or may be received at the processor 102 from an external source. In some examples, the current DISICTL IPL 108 managed and applied by system 100 as disclosed herein is applicable to both interrupts and traps. In other examples, the current DISICTL IPL 108 as disclosed herein managed and applied by system 100 is applicable to interrupts but not to traps.

Respective exceptions 114 have associated IPLs. For example, as shown in FIG. 1, exception A has an associated $IPL_a$, exception B has an associated $IPL_b$, and exception N has an associated $IPL_n$, wherein $IPL_a$, $IPL_b$, and $IPL_n$ may be respective values between 0-7. The processor 102 may update the current processor IPL 106 based on IPLs of respective exceptions 114. The processor 102 may handle exceptions 114 (including new and queued exceptions 114) in order of IPL priority, in particular in order from highest IPL to lowest IPL, wherein the processor 102 updates the current processor IPL 106 based on the exception 114 currently being handled (i.e., the processor 102 updates the current processor IPL 106 to the IPL of the currently handled exception 114). In some examples the processor 102 may include or utilize an interrupt controller (e.g., a programmable interrupt controller (PIC) for handling exceptions 114.

Respective DISICTL instructions 116 may specify (a) a respective DISICTL IPL (used by the processor 102 for updating the current DISICTL IPL 108) and optionally (b) a storage destination (used by the processor 102 for storing the prior value of the current DISICTL IPL 108 existing at the time the respective DISICTL instruction 116 is received). The DISICTL IPL specified in a respective DISICTL instruction 116 may indicate either (a) an IPL value (e.g., between 0-7) or (b) a memory location of a prior DISICTL IPL 110, which may be used by the processor 102 for updating the current DISICTL IPL 108. For example, a respective DISICTL instruction 116 may including a 3-bit literal (lit3) specifying an IPL value (e.g., between 0-7), or alternatively may specify the least significant (LS) 3-bits of the contents of a designated working register storing a prior DISICTL IPL 110 to be reinstated.

In some examples, unlike the current processor IPL 106 which is updated based on the exception 114 currently being handled, the current DISICTL IPL 108 established by a respective DISICTL instruction 116$n$ remains persistent (unchanged) until execution of a subsequent DISICTL instruction 116 by the processor 102, rather than the respective DISICTL instruction 116$n$ expiring after a defined (e.g., user selectable) number of cycles.

Thus, DISICTL instructions 116 may be used to disable exceptions 114 having an IPL equal to or below a specified DISICTL IPL, e.g., to execute a high-priority piece of code without interruption (except by exceptions 114 having an higher IPL than the DISICTL IPL).

As used herein, a "prior DISICTL IPL" refers to a DISICTL IPL that was previously set as the current DISICTL IPL 108 (upon execution of a respective DISICTL instruction 116) but replaced by a subsequent DISICTL IPL 108 (upon execution of a subsequent DISICTL instruction 116). When the current DISICTL IPL 108 is updated upon execution of a respective DISICTL instruction 116, for example from DISICTL IPL$_a$=6 (set by a prior DISICTL instruction 116) to DISICTL IPL$_a$=7 (set by the respective DISICTL instruction 116), the replaced DISICTL IPL (in this case, DISICTL IPL$_a$=6) may be stored as a prior DISICTL IPL 110.

The (optional) storage destination for storing the (replaced) current DISICTL IPL 108 as a prior DISICTL IPL 110 may specify a respective memory location. For example, as shown in FIG. 1, DISICTL instruction A specifies (a) DISICTL IPL$_a$ and optionally (b) a storage destination for storing the (replaced) current DISICTL IPL 108 as a prior DISICTL IPL 110. As discussed below, storing the (replaced) current DISICTL IPL 108 as a prior DISICTL IPL 110 allows a DISICTL IPL that has been replaced to be subsequently restored as the current DISICTL IPL 108, e.g., after completion of a program subroutine. For example, as discussed below with reference to FIG. 7, to execute code 112 including a first piece of code having an IPL=6 and a subroutine (second piece of code) having an IPL=7, the processor may (i) execute a first DISICTL instruction 116 to set the current DISICTL IPL 108 to IPL=6 prior to executing the first second piece of code, (ii) execute a second DISICTL instruction 116 when calling the subroutine (second piece of code) to set the current DISICTL IPL 108 to IPL=7 and to stored the replaced current DISICTL IPL 108 (IPL=6) as a prior DISICTL IPL 110, and (iii) execute a third DISICTL instruction 116 when completing the subroutine and resuming execution of the first piece of code, to restore the prior DISICTL IPL 110 (IPL=6) as the current DISICTL IPL 108.

The processor 102 may determine a highest IPL 109 between the current processor IPL 106 and the current DISICTL IPL 108 (e.g., the higher value of the current processor IPL 106 and the current DISICTL IPL 108), and apply the highest IPL for respective pieces of code, e.g., by disregarding exceptions (e.g., including new and queued exceptions) having a respective IPL equal to or lower than the highest IPL 109. Accordingly, the current DISICTL IPL 108 may "override" the current processor IPL 106, for example to allow the execution of high-priority code without interruption by exceptions 114 having an IPL equal to or below the current DISICTL IPL 108.

In some examples, the processor 102 may determine the highest IPL 109 by performing or initiating a comparison of the current processor IPL 106 and the current DISICTL IPL 108 (e.g., by a comparator provided in the processor 102) to determine the highest value between the two. In other examples, the processor 102 may determine the highest IPL 109 by receiving the highest IPL 109 from an external comparator or other component of system 100. In some examples, the processor 102 repeatedly determines the highest IPL 109, e.g., using a digital comparator that compares the current processor IPL 106 and the current DISICTL IPL 108 every _____ (or at a frequency of _____). In some examples, system 100 stores (and updates) the highest IPL 109 as a discrete element in memory 104, e.g., in a memory location distinct from the current processor IPL 106, current DISICTL IPL 108, (optional) prior DISICTL IPL(s) 110, and code 112. In other examples, the highest IPL 109 is not stored as a discrete element.

In other examples, the current DISICTL IPL 108 disables exceptions 114 having an associated IPL below the current DISICTL IPL 108 but allows the handling of exceptions 114 having an associated IPL equal to the current DISICTL IPL 108, unlike the current processor IPL 106 which prevents exceptions 114 having an associated IPL equal to or below the current processor IPL 106. In such examples, the system 100 may account for this difference between the current processor IPL 106 (disabling IPLs equal to or below the current processor IPL 106) and the current DISICTL IPL 108 (disabling IPLs below (but not equal to) the current DISICTL IPL 108) in any suitable manner, to accurately implement the intended priority-based exception management. For example, the system 100 may (a) apply an offset of one (1) to the current DISICTL IPL 108, i.e., by reducing the value of the DISICTL IPL values specified in respective DISICTL instructions 116 by 1, and (b) apply the highest IPL 109 as discussed above, i.e., by disabling (queuing) exceptions with IPLs equal to or below the highest IPL 109. Thus, for a situation in which current processor IPL=5 and a DISICTL instruction 116 specifies a DISICTL IPL=6, the processor 102 may set the current DISICTL IPL=5 to effectively allow (not disable) handling of an exception with IPL=6. As an alternative example, the system 100 may (a) select the current DISICTL IPL 108 as the highest IPL 109 only when the current DISICTL IPL 108 is higher than (by at least 1) the current processor IPL 106 and (b) when the current DISICTL IPL 108 is presently the highest IPL 109 (i.e., when the current DISICTL IPL 108 is higher than the current processor IPL 106), the processor 102 may disable exceptions 114 with an IPL below the current DISICTL IPL 108 but allow exceptions 114 with an IPL equal to the current DISICTL IPL 108.

In some examples, the processor 102 may process new exceptions 114 as follows, wherein a new exception 114 refers to an exception 114 currently received at the processor 102, as opposed to a queued or executed exception 114. When a new exception 114n having an $IPL_n$ is received at the processor 102, the processor 102 (a) compares the $IPL_n$ to the highest IPL 109. If the $IPL_n$ is greater than the highest IPL 109, the processor 102 updates the current processor IPL 106 to the $IPL_n$, interrupts its current operations (e.g., code execution), and handles the exception 114n (e.g., by executing respective code 112 associated with exception 114n). Alternatively, if the $IPL_n$ of the exception 114 is less than or equal to the current processor IPL 106, processor 102 leaves the current processor IPL 106 unchanged and queues the exception 114n for subsequent handling according to the respective priority (IPL values) of other queued and new exceptions 114.

In some examples, the processor 102 may process DISICTL instructions 116 as follows. When a respective DISICTL instruction 116n specifying $DISICTL\ IPL_n$ is received at the processor 102, the processor 102 updates the current DISICTL IPL 108 based on the $DISICTL\ IPL_n$ specified by the respective DISICTL instruction 116n, regardless of whether $DISICTL\ IPL_n$ is greater than or less than the prior DISICTL IPL, i.e., the current DISICTL IPL 108 at the time the DISICTL instruction 116n is received. As noted above, the respective $DISICTL\ IPL_n$ may specify either (a) an IPL value (e.g., between 0-7) or (b) a memory location of a prior DISICTL IPL 110. If the $DISICTL\ IPL_n$ specifies an IPL value, the processor 102 updates the current DISICTL IPL 108 to the specified IPL value. If the $DISICTL\ IPL_n$ specifies the memory location of the prior DISICTL IPL 110, the processor 102 restores the prior DISICTL IPL 110 as the current DISICTL IPL 108. Optionally, the processor 102 may store the (replaced) current DISICTL IPL 108 as a prior DISICTL IPL 110.

Figure 2:
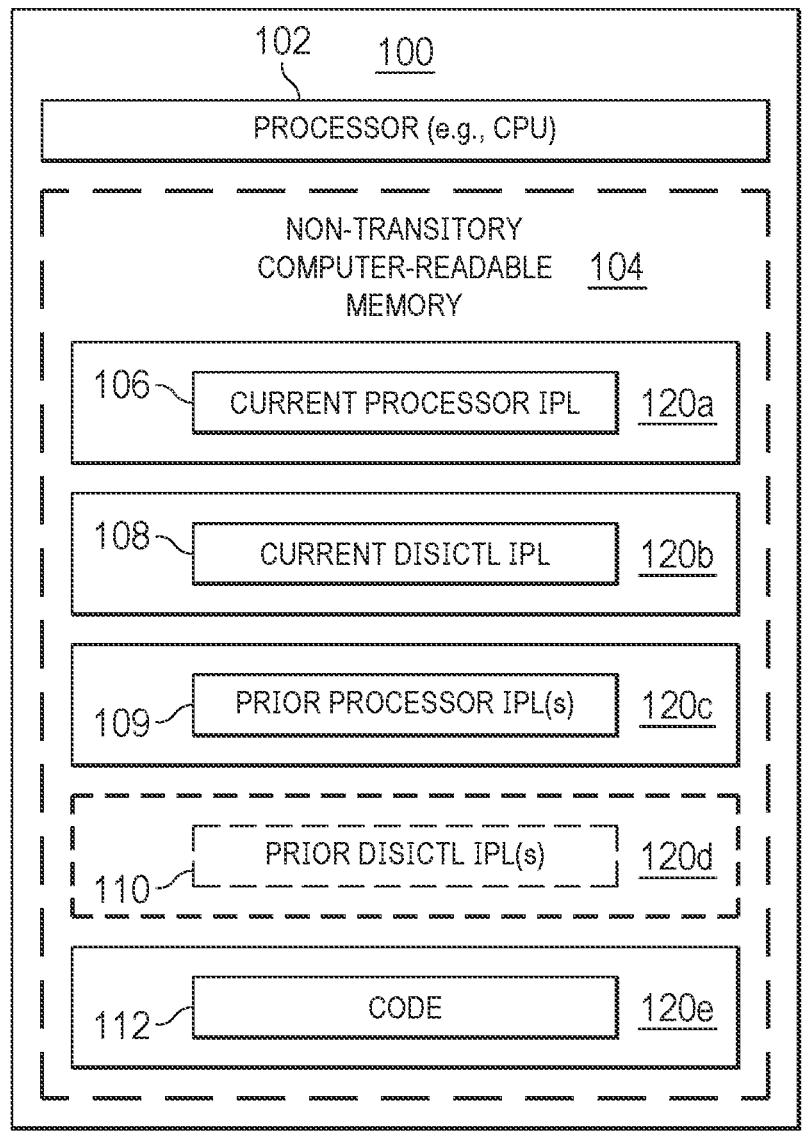
FIG. 2 shows aspects of the example system (e.g., computer system) 100 for managing exceptions, according to one example.

FIG. 2 shows aspects of the example system (e.g., computer system) 100 for managing exceptions, according to one example. As discussed above, the current processor IPL 106, the current DISICTL IPL 108, prior processor IPL(s) 109, and (optionally) prior DISICTL IPL(s) 110 may be stored in memory 104. There is no limitation as to the number of prior processor IPL(s) 109 and prior DISICTL IPLs 110 that may be stored in memory 104. As shown in FIG. 2, the current processor IPL 106 may be stored in a first memory location 120a, the current DISICTL IPL 108 may be stored in a second memory location 120b, prior processor IPL(s) 109 may be stored in a third memory location 120c, the (optional) prior DISICTL IPL(s) 110 may be stored in at least one (optional) fourth memory location 120d, and code 112 may be stored in a fifth memory location 120e. Respective ones of the first memory location 120a, second memory location 120b, third memory location(s) 120d, optional fourth memory location(s) 120d, and fifth memory location 120e may be located internal to the processor 102 or external from the processor, e.g., in memory device(s) connected to, or in communication with, the processor 102 by a bus or other communications link(s).

In some examples, memory 104 may include multiple third memory locations 120c for storing multiple prior DISICTL IPL 110, e.g., for storing and restoring multiple DISICTL IPL values associated with nested DISICTL IPL instructions, e.g., for executing instruction nesting within function calls or interrupt service routines having different priority levels (e.g., as discussed below with reference to the example method 700 shown in FIG. 7).

Figure 3:
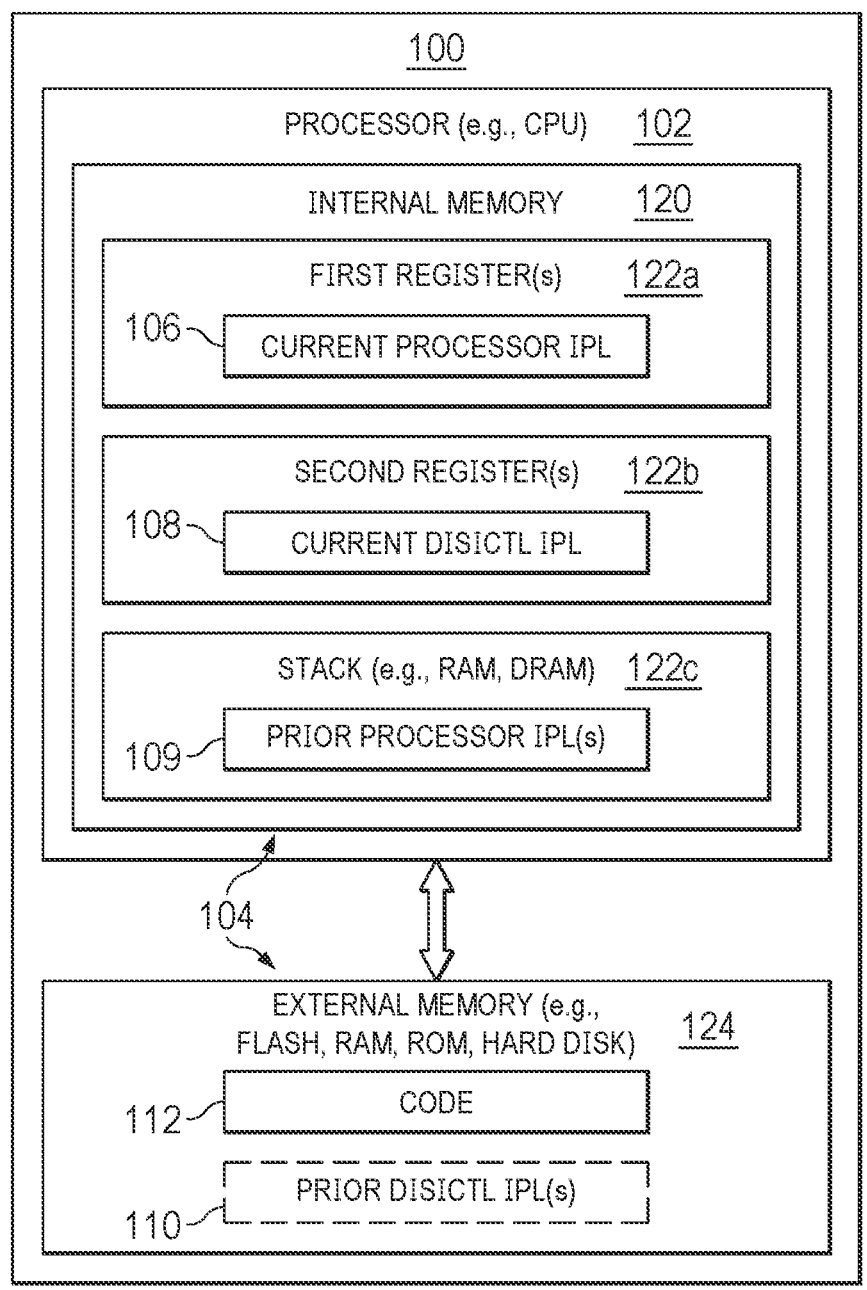
FIG. 3 shows example memory locations for various information related to the example system shown in FIG. 1, according to one example.

FIG. 3 shows aspects of the example system (e.g., computer system) 100, illustrating storage of various information, according to one example. As shown, memory 104 of system 100 may include internal memory 120 of processor 102 and external memory 124 external to processor 102. In this example, the internal memory 120 of processor 102 includes one or more first registers (e.g., working registers) 122a storing the current processor IPL 106 and one or more second registers (e.g., working registers) 122b storing the current DISICTL IPL 108. The processor 102 may store prior processor IPL(s) 109 as a component of machine state information (e.g., including prior processor IPL(s) 109, program counters, processor status (SR), and other state information) in the processor stack, e.g., in RAM, DRAM, or other suitable memory device. The external memory 124 may store the (optional) prior DISICTL IPL(s) 110 and code 112. For example, the prior DISICTL IPL 110 may be stored in RAM memory, and code 112 may be stored in a hard drive, RAM, or flash memory. In some examples the current DISICTL IPL 108 and (optional) prior DISICTL IPL(s) 110 are stored as 3-bit values in respective registers or other memory locations.

Figure 4:
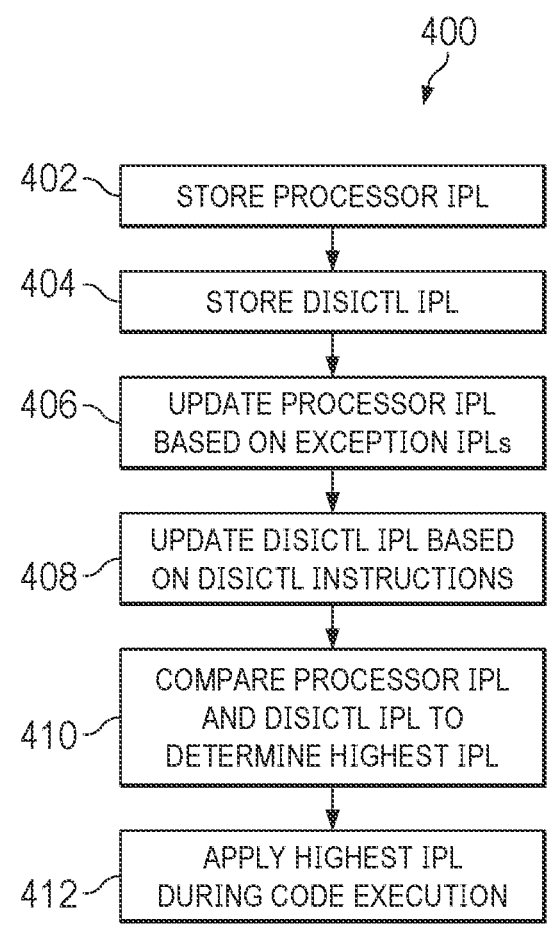
FIG. 4 shows an example process, e.g., performed by the example system shown in FIGS. 1-3, for determining and applying a highest IPL.

FIGS. 4-7 are example flowcharts illustrating example processes implemented by the example system 100 discussed above. FIG. 4 shows an example process 400 e.g., performed by the example system 100 shown in FIGS. 1-3, for determining and applying a highest IPL 109. The various operations of process 400 discussed below may be performed in any order, in sequential order or in parallel, and according to any suitable timing or frequency.

At 402, the system 100 stores a current processor IPL 106 in memory, e.g., in a first designated working register in the processor 102. At 402, the system 100 stores a current DISICTL IPL 108 in memory, e.g., in a second designated working register in the processor 102.

At 406, the processor 102 updates the current processor IPL 106 based on IPLs associated with respective exceptions 114 (e.g., interrupts and/or traps). In some examples, the processor 102 updates the current processor IPL 106 to the IPL of the respective exception 114 currently being handled (e.g., by an interrupt controller of the processor 102), and stores prior processor IPL(s) 109 associated with interrupted operations on the processor stack (as machine state information).

At 408, the processor 102 updates the current DISICTL IPL 108 based on received DISICTL instructions 116, wherein respective DISICTL instructions 116 specify respective DISICTL IPLs (e.g., by specifying an DISICTL IPL value or specifying a memory location of a stored prior DISICTL IPL 110 to be restored as the current DISICTL IPL 108). Respective DISICTL IPLs of respective DISICTL instructions 116 may be user-definable (e.g., to values from 0-7) by a code developer or other user creating the DISICTL instructions 116. In some examples, the processor 102 maintains the current processor IPL 106 unchanged until a next DISICTL instruction 116 specifying a new DISICTL IPL is executed by the processor 102.

At 410, the processor 102 compares the current processor IPL 106 and the current DISICTL IPL 108 to determine the highest IPL 109 (i.e., the higher value of the current processor IPL 106 and the current DISICTL IPL 108). In some examples, the processor 102 may perform this comparison (to determine the current value of the highest IPL 109) repeatedly over time, as the current processor IPL 106 and current DISICTL IPL 108 are updated over time as respective exceptions 114 and DISICTL instructions 116 are processed by the processor 102. In some examples, a comparator provided in the processor 102 may repeatedly compare the current processor IPL 106 and the current DISICTL IPL 108 to determine the highest IPL 109, e.g., at a frequency of every _____ In some examples, system 100 stores (and updates) the highest IPL 109 in memory 104. In other examples, the highest IPL 109 is not stored.

At 412, the processor 102 applies the highest IPL 109 (which changes over time according to respective updates of the current processor IPL 106 and the current DISICTL IPL 108 at 406 and 408, respectively, and highest IPL 109 determinations at 410) during execution of respective pieces of code 112. In some examples, the processor 102 applies the highest IPL 109 by disregarding exceptions 114 having an IPL equal to or lower than the highest IPL 109.

Figure 5:
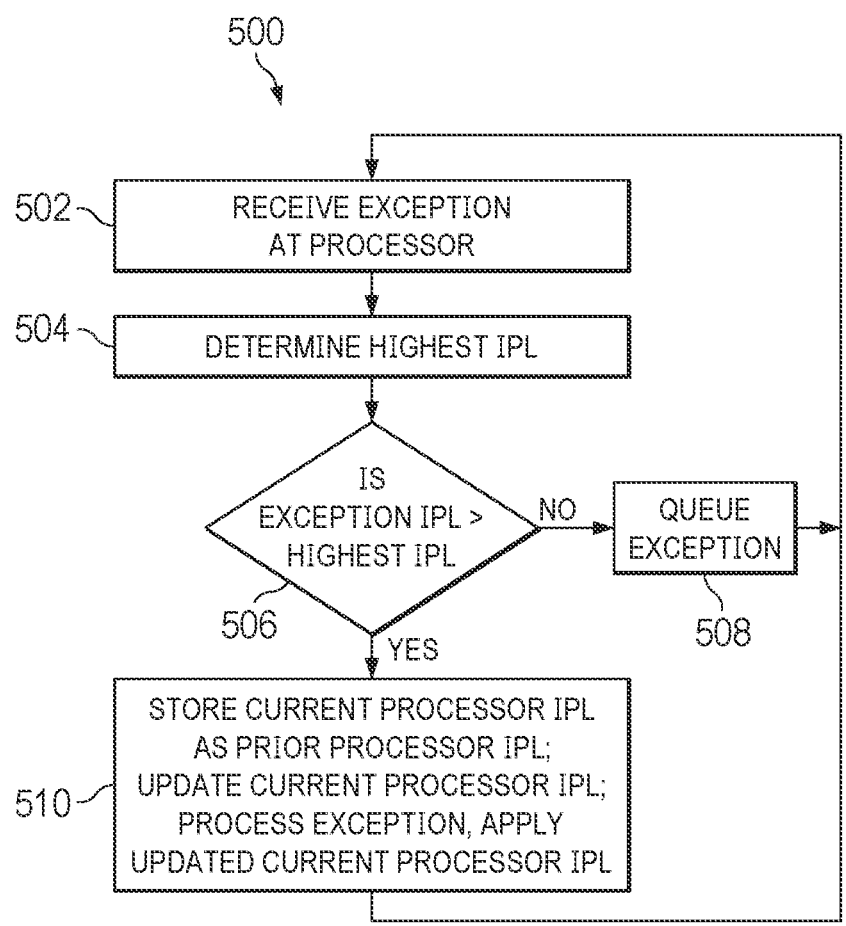
FIG. 5 shows an example process, e.g., performed by the example system shown in FIGS. 1-3, for managing the handling of exceptions, according to one example.

FIG. 5 shows an example process 500 e.g., performed by the example system 100 shown in FIGS. 1-3, for managing the handling of exceptions 114, according to one example. At 502, an exception $114_n$ (e.g., an interrupt or trap) with an $IPL_n$ is received at the processor 102, e.g., during the execution of respective pieces of code 112. The exception $114_n$ may be newly received at the processor 102, or previously queued by the processor 102 and now ready for handling.

In response, at 504-508, the processor 102 determines whether to interrupt its current operations and handle the exception $114_n$ currently, or alternatively queue the exception $114_n$ for handling at a later time. At 504, the processor determines the highest IPL 109, e.g., by comparing the current processor IPL 106 and the current DISICTL IPL 108 (e.g., as discussed above at 410) or alternatively by accessing the highest IPL 109 from memory (in an example in which the highest IPL 109 is stored in memory).

At 506, the processor 102 compares the $IPL_n$ of the exception $114_n$ with the highest IPL 109. If the $IPL_n$ is equal to or lower than the highest IPL 109, at 508 the processor 102 queues the exception $114_n$ (e.g., in memory 104) at 510 for later handling, e.g., when (a) there are no other queued exceptions 114 having a higher IPL than $IPL_n$ and (b) $IPL_n$ is above the highest IPL 109 (e.g., when the $IPL_n$ is above the current DISICTL IPL 108 such that the current DISICTL IPL 108 des not prevent the handling of the exception $114_n$).

Alternatively, if $IPL_n$ is higher than the highest IPL 109, at 510 the processor 102 sets $IPL_n$ as the current processor IPL 106, interrupts its current operations, stores the current processor IPL 106 as a prior processor IPL 109, and handles the exception $114_n$, e.g., by executing a piece of code 112 associated with the exception $114_n$. While handling the exception $114_n$, the processor 102 disregards new and queued exceptions 114 having a IPL lower than or equal to $IPL_n$, whereas the processor 102 may interrupt handling of the exception $114_n$ upon receiving an exception 114 having a higher IPL or upon receiving a DISICTL instruction 116 specifying a DISICTL IPL higher than $IPL_n$.

Figure 6:
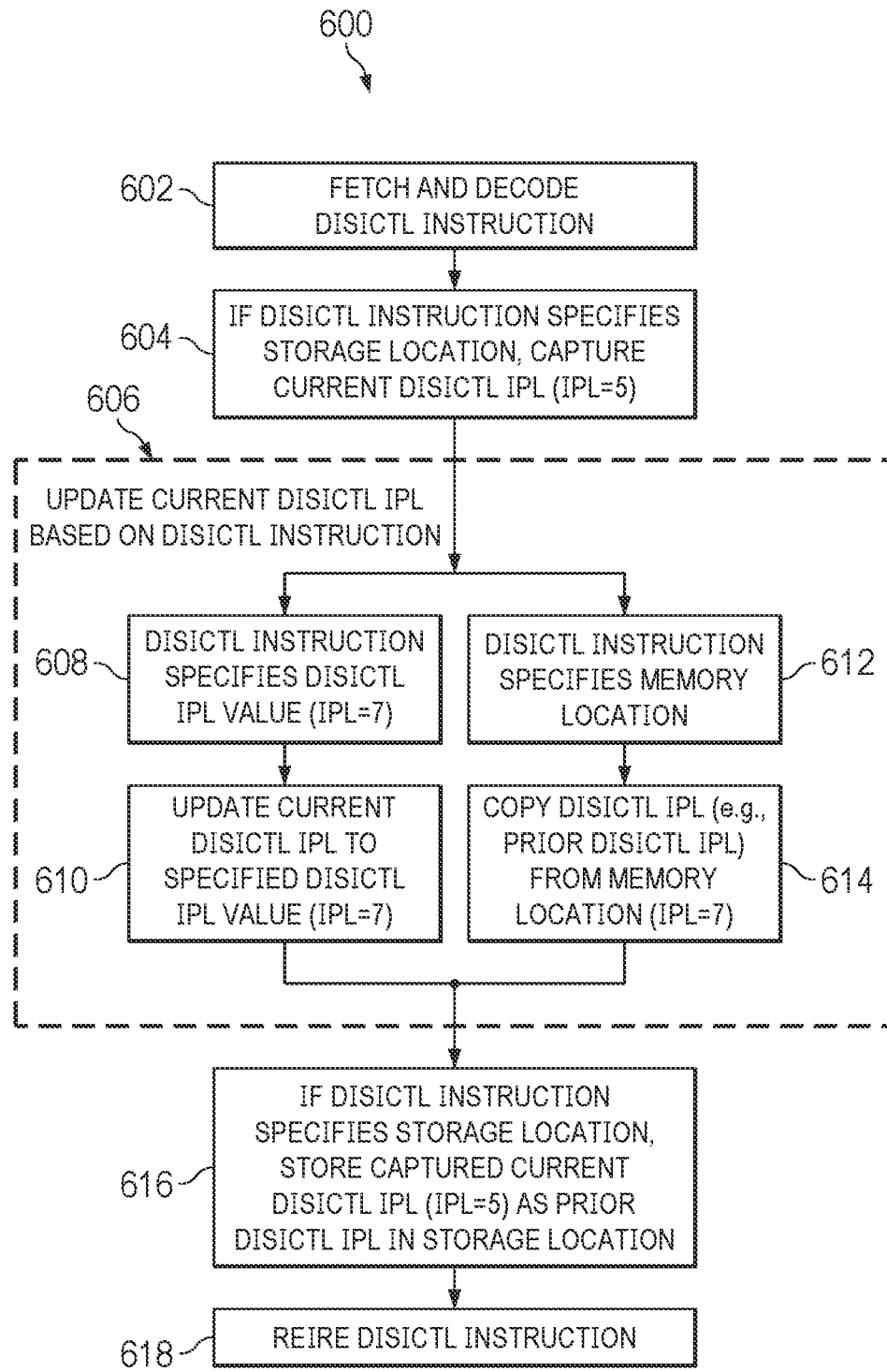
FIG. 6 shows an example process, e.g., performed by the example system shown in FIGS. 1-3, for executing an example DISICTL instruction to update the current DISICTL IPL (and optionally to store the replaced current DISICTL IPL as a prior DISICTL IPL)

FIG. 6 shows an example process 600 e.g., performed by the example system 100 shown in FIGS. 1-3, for executing an example DISICTL instruction $116_n$ by the processor 102 to update the current DISICTL IPL 108 (and optionally to store the current DISICTL IPL 108 as a prior DISICTL IPL 110). At 602, the processor 102 fetches and decodes the DISICTL instruction $116_n$. At 604, if the DISICTL instruction $116_n$ specifies a storage destination (for storing the current DISICTL IPL 108 as a prior DISICTL IPL 110), the processor 102 captures the current DISICTL IPL 108 (e.g., IPL=5).

At 606, the processor 102 updates the current DISICTL IPL 108 based on the DISICTL instruction $116_n$, depending on the form in which DISICTL instruction $116_n$ specifies the DISITCTL $IPL_n$. For example, if DISICTL instruction $116_n$ specifies the DISITCTL $IPL_n$ as a value (e.g., IPL=7) as indicated at 608, the processor 102 updates the current DISICTL IPL 108 to the specified value (e.g., 7) at 610. Alternatively, if DISICTL instruction $116_n$ specifies the DISITCTL $IPL_n$ as a memory location (e.g., the memory location of the prior DISICTL IPL 110 or another memory location) at indicated at 612, the processor 102 copies the DISICTL IPL (e.g., IPL=7) from the specified memory location (e.g., the stored prior DISICTL IPL 110) to the current DISICTL IPL 108, so as to update the current DISICTL IPL 108 to the identified IPL (e.g., IPL=7) at 614.

At 616, if the processor captured the current DISICTL IPL 108 at 604 (e.g., based on the DISICTL instruction $116_n$ specifying a storage destination, at 616 the processor 102 stores the captured current DISICTL IPL 108 (e.g., IPL=5) to the specified storage destination as a prior DISICTL IPL 110. At 618, the processor 102 retires the DISICTL instruction $116_n$.

Figure 7:
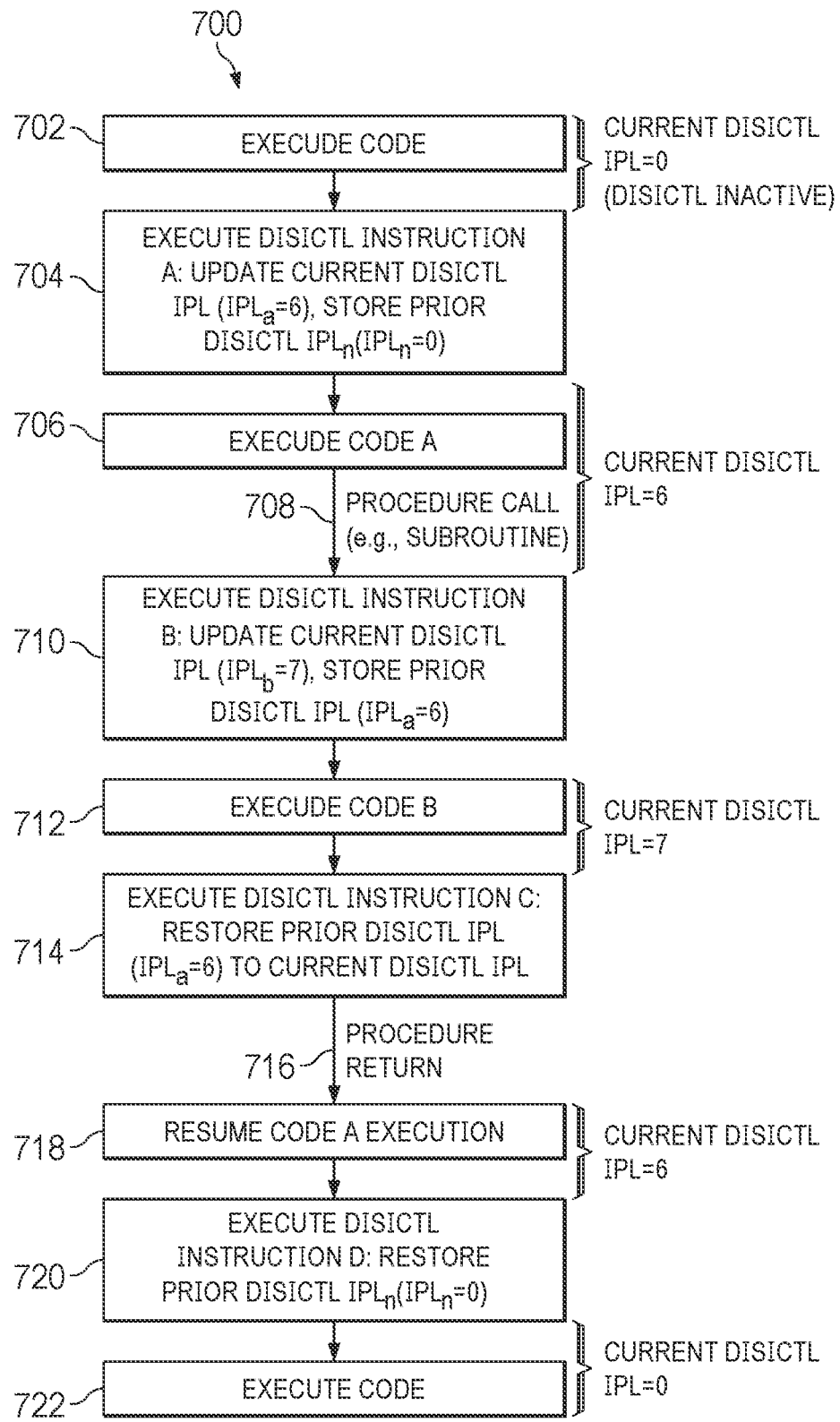
FIG. 7 shows an example process, e.g., performed by the example system shown in FIGS. 1-3, for executing nested DISICTL instructions, e.g., for executing a subroutine having a different (e.g., higher) priority than the subroutine-calling code.

FIG. 7 shows an example process 700 for executing nested DISICTL instructions 116, e.g., for executing a subroutine having a different (e.g., higher) priority than the subroutine-calling code, according to one example. At 702, the processor 102 executes respective code 112, while the current DISICTL IPL 108 is set to $IPL_n=0$, e.g., wherein DISICTL is inactive and the processing of exceptions is controlled by the current processor IPL 106.

At 704, the processor 102 executes a first DISICTL instruction "DISICTL instruction A" associated with a first piece of code 112 ("Code A"). DISICTL instruction A itself may be considered part of Code A, part of the interrupted code being executed at 112, or distinct from the two, depending on the relevant code structure. In this example, DISICTL instruction A specifies (a) DISICTL $IPL_a=6$ and (b) a first storage destination. Accordingly, the processor 102 updates the current DISICTL IPL 108 to 6 ($IPL_a=6$), and stores the (replaced) current DISICTL IPL 108 ($IPL_n=0$) in the specified first storage destination as a first prior DISICTL IPL 110. At 706, the processor 102 executes Code A, e.g., a first piece of code 112, under the current DISICTL IPL 108 set to 6.

At 708, the processor 102 reaches a procedure call in Code A, e.g., for executing a subroutine comprising a second piece of code 112 (Code B) having a higher priority than Code A. At 710 the processor 102 executes a second DISICTL instruction "DISICTL instruction B" associated with Code B. DISICTL instruction B itself may be considered part of Code A, part of Code B, or distinct from Code A and Code B, depending on the relevant code structure. In this example, DISICTL instruction B specifies (a) DISICTL $IPL_b=7$ and (b) a second storage destination. Accordingly, the processor 102 updates the current DISICTL IPL 108 to 7 ($IPL_b=7$), and stores the (replaced) current DISICTL IPL 108 ($IPL_a=6$) in the specified second storage destination as a second prior DISICTL IPL 110. At 712, the processor 102 executes Code B (e.g., subroutine), e.g., a second piece of code 112, under the current DISICTL IPL 108 set to 7.

At 714, at the completion of Code B (subroutine), the processor 102 executes a third DISICTL instruction "DISICTL instruction C" (e.g., included in Code B) to restore the current DISICTL IPL from the second storage destination, e.g. to 6, before returning to Code A. DISICTL instruction C itself may be considered part of Code B, part of Code A, or distinct from Code B and Code A, depending on the relevant code structure. In this example, DISICTL instruction C specifies DISICTL $IPL_c=6$, e.g., by specifying the memory location of the stored prior DISICTL $IPL_a=6$, in this example, the second storage destination. Alternatively, DISICTL instruction C may specify DISICTL $IPL_c$ by specifying the DISICTL IPL value. Accordingly, the processor 102 restores the current DISICTL IPL 108 to 6 ($IPL_c = IPL_a = 6$). At 716, the processor 102 executes a procedure return, and resumes execution of Code A at 718 under the current DISICTL IPL 108 set to 6.

At the completion of Code A execution, at 720 the processor 102 executes a fourth DISICTL instruction "DISICTL instruction D" (e.g., included in Code A) to restore the DISICTL IPL to 0, e.g., to deactivate DISICTL IPL. DISICTL instruction D itself may be considered part of Code A or distinct from Code A, depending on the relevant code structure. In this example, DISICTL instruction D specifies DISICTL $IPL_d = 0$, e.g., by specifying the memory location of the stored prior DISICTL $IPL_n = 6$, in this example, the first storage destination. Alternatively, the DISICTL instruction D may specify the DISICTL IPL, e.g., value of 0. Accordingly, the processor 102 restores the current DISICTL IPL 108 to 0 ($IPL_d = IPL_n = 0$), in other words returning DISICTL IPL to an inactive state. At 722, the processor 102 executes further code 112, while the current DISICTL IPL 108 is set to $IPL_n = 0$, e.g., wherein processing of exceptions is controlled by the current processor IPL 106.

The invention claimed is:

1. A system, comprising:
non-transitory computer readable memory storing:
a current processor interrupt priority level;
a current disable interrupt control (DISICTL) interrupt priority level; and
a processor to:
update the current processor interrupt priority level based on respective interrupt priority levels associated with respective exceptions;
update the current DISICTL interrupt priority level based on a respective DISICTL instruction, wherein the respective DISICTL instruction specifies a respective user-definable DISICTL interrupt priority level; and
disable exceptions having a respective associated interrupt priority level equal to or lower than a highest interrupt priority level between the current processor interrupt priority level and the current DISICTL interrupt priority level during execution of respective code.

2. The system of claim 1, wherein the processor includes a processor stack storing at least one prior processor interrupt priority level.

3. The system of claim 1, wherein the non-transitory computer readable memory comprises:
at least one first register in the processor storing the current processor interrupt priority level; and
at least one second register in the processor storing the current DISICTL interrupt priority level.

4. The system of claim 1, wherein the respective DISICTL instruction specifying the respective user-definable DISICTL interrupt priority level comprises the respective DISICTL instruction specifying a value of the user-definable DISICTL interrupt priority level.

5. The system of claim 1, wherein the respective DISICTL instruction specifying the respective user-definable DISICTL interrupt priority level comprises the respective DISICTL instruction specifying a memory location of a prior DISICTL interrupt priority level.

6. The system of claim 1, wherein:
the respective DISICTL instruction specifies (a) a respective user-definable DISICTL interrupt priority level and (b) a storage destination; and
the processor to execute the respective DISICTL instruction, including to:
update the current DISICTL interrupt priority level from a prior DISICTL interrupt priority level to the respective user-definable DISICTL interrupt priority level specified in the respective DISICTL instruction; and
store the prior DISICTL interrupt priority level in the storage destination specified in the respective DISICTL instruction.

7. The system of claim 1, wherein the processor to:
execute the respective DISICTL instruction specifying the respective user-definable DISICTL interrupt priority level, wherein execution of the respective DISICTL instruction includes to update the current DISICTL interrupt priority level from a prior DISICTL interrupt priority level to the respective user-definable DISICTL interrupt priority level specified in the respective DISICTL instruction.

8. The system of claim 7, wherein:
execution of the respective DISICTL instruction includes to store the prior DISICTL interrupt priority level; and
the processor to, after the execution of a first piece of the respective code associated with the respective DISICTL instruction, to restore the stored prior DISICTL interrupt priority level as the current DISICTL interrupt priority level.

9. The system of claim 8, wherein the non-transitory computer readable memory comprises:
a first memory location storing the current processor interrupt priority level;
a second memory location storing the current DISICTL interrupt priority level; and
a third memory location storing the prior DISICTL interrupt priority level.

10. The system of claim 7, wherein the processor to:
after executing a portion of a first piece of the respective code, execute a second DISICTL instruction specifying a second user-definable DISICTL interrupt priority level to update the current DISICTL interrupt priority level to the second user-definable DISICTL interrupt priority higher than the respective user-definable DISICTL interrupt priority level;
disable exceptions having a respective associated interrupt priority level equal to or lower than the second user-definable DISICTL interrupt priority level during execution of a second piece of the respective code;
after the execution of the second piece of the respective code, restore the current DISICTL interrupt priority level to the respective user-definable DISICTL interrupt priority level; and
continue execution of the first piece of the respective code.

11. A system, comprising:
non-transitory computer readable memory including:
a first memory location for storing a current disable interrupt control (DISICTL) interrupt priority level; and
a second memory location for storing a prior DISICTL interrupt priority level, and
a processor to:
store a first DISICTL interrupt priority level associated with a first DISICTL instruction as the current DISICTL interrupt priority level in the first memory location;
disable exceptions having a respective associated interrupt priority level equal to or lower than the first DISICTL interrupt priority level during execution of a first piece of code; and execute a second DISICTL instruction specifying a second DISICTL interrupt priority level, wherein execution of the second DISICTL instruction includes:
  store the second DISICTL interrupt priority level specified by the second DISICTL instruction as the current DISICTL interrupt priority level in the first memory location;
  store the first DISICTL interrupt priority level as the prior DISICTL interrupt priority level in the second memory location; and
  disable exceptions having a respective associated interrupt priority level equal to or lower than the second DISICTL interrupt priority level during execution of a second piece of code.

12. The system of claim 11, wherein:
the second DISICTL instruction specifying the second DISICTL interrupt priority level comprises the second DISICTL instruction specifying the second memory location; and
the processor to store the second DISICTL interrupt priority level specified by the second DISICTL instruction as the current DISICTL interrupt priority level in the first memory location comprises the processor to (a) access the prior DISICTL interrupt priority level stored in the second memory location and (b) store the accessed prior DISICTL interrupt priority level as the current DISICTL interrupt priority level in the first memory location.

13. The system of claim 11, the processor to:
execute a third DISICTL instruction specifying a third DISICTL interrupt priority level, wherein execution of the third DISICTL instruction includes:
  store the third DISICTL interrupt priority level specified by the third DISICTL instruction as the current DISICTL interrupt priority level in the first memory location; and
  store the second DISICTL interrupt priority level as the prior DISICTL interrupt priority level in the second memory location; and
  disable exceptions having a respective associated interrupt priority level equal to or lower than the third DISICTL interrupt priority level during execution of a third piece of code.

14. A method, comprising:
storing in non-transitory computer readable memory a current processor interrupt priority level;
storing in the non-transitory computer readable memory a current disable interrupt control (DISICTL) interrupt priority level;
updating, by a processor, the current processor interrupt priority level based on respective interrupt priority levels associated with respective exceptions;
updating, by the processor, the current DISICTL interrupt priority level based on a respective DISICTL instruction, wherein the respective DISICTL instruction specifies a respective user-definable DISICTL interrupt priority level; and
disabling, by the processor, exceptions having a respective associated interrupt priority level equal to or lower than a highest interrupt priority level between the current processor interrupt priority level and the current DISICTL interrupt priority level during execution of respective code.

15. The method of claim 14, wherein the processor includes a processor stack storing at least one prior processor interrupt priority level.

16. The method of claim 14, wherein:
the respective DISICTL instruction specifying the respective DISICTL interrupt priority level comprises the respective DISICTL instruction specifying a value of the respective DISICTL interrupt priority level; and
updating, by the processor, the current DISICTL interrupt priority level based on the respective DISICTL instruction comprises setting the current DISICTL interrupt priority level to the value of the respective DISICTL interrupt priority level specified in the respective DISICTL instruction.

17. The method of claim 14, wherein:
the respective DISICTL instruction specifying the respective DISICTL interrupt priority level comprises the respective DISICTL instruction specifying a memory location of a prior DISICTL interrupt priority level; and
updating, by the processor, the current DISICTL interrupt priority level based on the respective DISICTL instruction comprises:
  accessing the prior DISICTL interrupt priority level in the memory location specified in the respective DISICTL instruction; and
  setting the accessed prior DISICTL interrupt priority level as the current DISICTL interrupt priority level.

18. The method of claim 14, comprising:
executing, by the processor, the respective DISICTL instruction specifying the respective user-definable DISICTL interrupt priority level, wherein executing the respective DISICTL instruction includes setting the current DISICTL interrupt priority level to the respective user-definable DISICTL interrupt priority level;
disabling, by the processor, exceptions having a respective associated interrupt priority level equal to or lower than the respective user-definable DISICTL interrupt priority level during execution of a first piece of the respective code.

19. The method of claim 18, wherein:
executing the respective DISICTL instruction comprises storing in non-transitory computer readable memory a prior DISICTL interrupt priority level; and
the method comprises, after the execution of the first piece of the respective code:
  accessing the stored prior DISICTL interrupt priority level; and
  setting the accessed prior DISICTL interrupt priority level as the current DISICTL interrupt priority level.

20. The method of claim 18, comprising:
after executing a portion of the first piece of the respective code, executing, by the processor, a second user-definable DISICTL instruction specifying a second DISICTL interrupt priority level higher than the respective user-definable DISICTL interrupt priority level;
wherein executing the second DISICTL instruction includes setting the current DISICTL interrupt priority level to the second user-definable DISICTL interrupt priority level;
disabling, by the processor, exceptions having a respective associated interrupt priority level equal to or lower than the second user-definable DISICTL interrupt priority level during execution of a second piece of the respective code;
after execution of the second piece of the respective code, restoring, by the processor, the respective user-definable DISICTL interrupt priority level as the current DISICTL interrupt priority level;
continuing execution of the first piece of the respective code; and disabling, by the processor, exceptions having a respective associated interrupt priority level equal to or lower than the respective user-definable DISICTL interrupt priority level during the continued execution of the first piece of the respective code.

\* \* \* \* \*